United States Patent
Liguore et al.

(10) Patent No.: US 7,419,031 B2
(45) Date of Patent: Sep. 2, 2008

(54) INTEGRALLY DAMPED COMPOSITE AIRCRAFT FLOOR PANELS

(75) Inventors: Salvatore L. Liguore, St. Louis, MO (US); Joshua M. Montgomery, Seattle, WA (US); Mark L. Younie, Snohomish, WA (US); Robert G. Rackl, Renton, WA (US)

(73) Assignee: The Boeing Company, Chicago, IL (US)

( * ) Notice: Subject to any disclaimer, the term of this patent is extended or adjusted under 35 U.S.C. 154(b) by 445 days.

(21) Appl. No.: 11/163,957

(22) Filed: Nov. 4, 2005

(65) Prior Publication Data

US 2007/0102239 A1    May 10, 2007

(51) Int. Cl.
G10K 11/16 (2006.01)
G10K 11/168 (2006.01)
E04B 1/84 (2006.01)
G10K 11/04 (2006.01)

(52) U.S. Cl. .................. 181/210; 181/292; 181/288
(58) Field of Classification Search ............ 181/210, 181/290, 292, 288, 207
See application file for complete search history.

(56) References Cited

U.S. PATENT DOCUMENTS

| | | | | |
|---|---|---|---|---|
| 3,502,171 A | * | 3/1970 | Cowan | 181/292 |
| 3,977,492 A | * | 8/1976 | Hankel | 181/292 |
| 4,111,081 A | * | 9/1978 | Hilliard et al. | 181/290 |
| 4,301,890 A | | 11/1981 | Zalas | |
| 4,317,503 A | | 3/1982 | Soederquist | |
| 4,416,349 A | * | 11/1983 | Jacobs | 181/208 |
| 4,425,980 A | * | 1/1984 | Miles | 181/208 |
| 4,641,726 A | | 2/1987 | Fearon | |
| 4,678,707 A | * | 7/1987 | Shinozaki et al. | 428/323 |
| 5,068,001 A | * | 11/1991 | Haussling | 156/222 |
| 5,151,311 A | * | 9/1992 | Parente et al. | 428/116 |
| 5,175,401 A | * | 12/1992 | Arcas et al. | 181/292 |
| 5,344,280 A | | 9/1994 | Langenbrunner | |
| 5,414,232 A | * | 5/1995 | Wilson | 181/292 |
| 5,543,198 A | * | 8/1996 | Wilson | 428/116 |
| 5,904,318 A | * | 5/1999 | Towfiq | 244/1 N |
| 6,099,683 A | | 8/2000 | Meier | |
| 6,110,985 A | * | 8/2000 | Wheeler | 521/83 |
| 6,220,388 B1 | | 4/2001 | Sanborn | |
| 6,755,280 B2 | * | 6/2004 | Porte et al. | 181/290 |
| 6,764,754 B1 | | 7/2004 | Hunter | |
| 6,913,110 B1 | * | 7/2005 | Ritto | 181/199 |
| 2006/0118357 A1 | * | 6/2006 | Braun et al. | 181/290 |
| 2006/0208135 A1 | * | 9/2006 | Liguore et al. | 244/117 R |

FOREIGN PATENT DOCUMENTS

CA    2119641 A1    2/1994
JP    06226891 A    8/1994

* cited by examiner

*Primary Examiner*—Edgardo San Martin
(74) *Attorney, Agent, or Firm*—Ostrager Chong Flaherty & Broitman P.C.

(57) ABSTRACT

In accordance with the present invention an aircraft floor panel is provided comprising a honeycomb core element having an upper core surface, a lower core surface, and a core thickness. An upper face sheet assembly is mounted to and seals the upper core surface and includes at least one upper material sheet impregnated with an upper epoxy resin. A lower damping face sheet assembly is mounted to and seals the lower core surface and includes at least one lower material sheet infused with a highly damped lower epoxy resin. The lower damping face sheet assembly dampens vibrational noise.

20 Claims, 2 Drawing Sheets

INTEGRALLY DAMPED COMPOSITE AIRCRAFT FLOOR PANELS

TECHNICAL FIELD

The present invention relates generally to an apparatus and method for the damping of aircraft interior floor panels, and more particularly to an apparatus and method for integrating such damping directly into composite aircraft floor panels.

BACKGROUND OF THE INVENTION

Commercial aircraft must not only meet strength, weight and cost objectives they must also be designed to achieve adequate customer satisfaction. One arena of customer satisfaction arises regarding passenger comfort. The reduction of interior noise levels is considered critical to passenger comfort. A wide variety of noise sources come from many locations outside and inside the airframe. Aircraft design benefits are achieved by addressing these noise sources and minimizing their impact on passengers.

One known noise source into the main cabin is through the aircraft floor panels. The floor panels are typically constructed using lightweight designs with high rigidity. These very light weight structural solutions are typically not efficient at reducing noise that transmits through them. Because the floor panels are stiff, they have fast traveling bending waves which tend to match well with acoustic waves which produce a low coincidence frequency. The floor panels, therefore, have a high radiation efficiency which is bad for interior noise.

A current methodology for dealing with such resonant floor panels is through the use of add-on damping patches bonded to the underside of the floor for the purpose of increasing damping. This approach adds extra weight, fabrication costs, and installation costs to the floor panel design.

What is needed is a design and method for increasing damping in floor panels that was more weight and cost effective than current add-on damping techniques. Additionally, it would be highly desirable to have a design and method for such floor panels that simplified the time and complexity of fabrication.

SUMMARY OF THE INVENTION

In accordance with the present invention an aircraft floor panel is provided comprising a honeycomb core element having an upper core surface, a lower core surface, and a core thickness. An upper face sheet assembly is mounted to and seals the upper core surface and includes at least one upper material sheet impregnated with an upper epoxy resin. A lower damping face sheet assembly is mounted to and seals the lower core surface and includes at least one lower material sheet infused with a highly damped lower epoxy resin. The lower damping face sheet assembly dampens vibrational noise.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
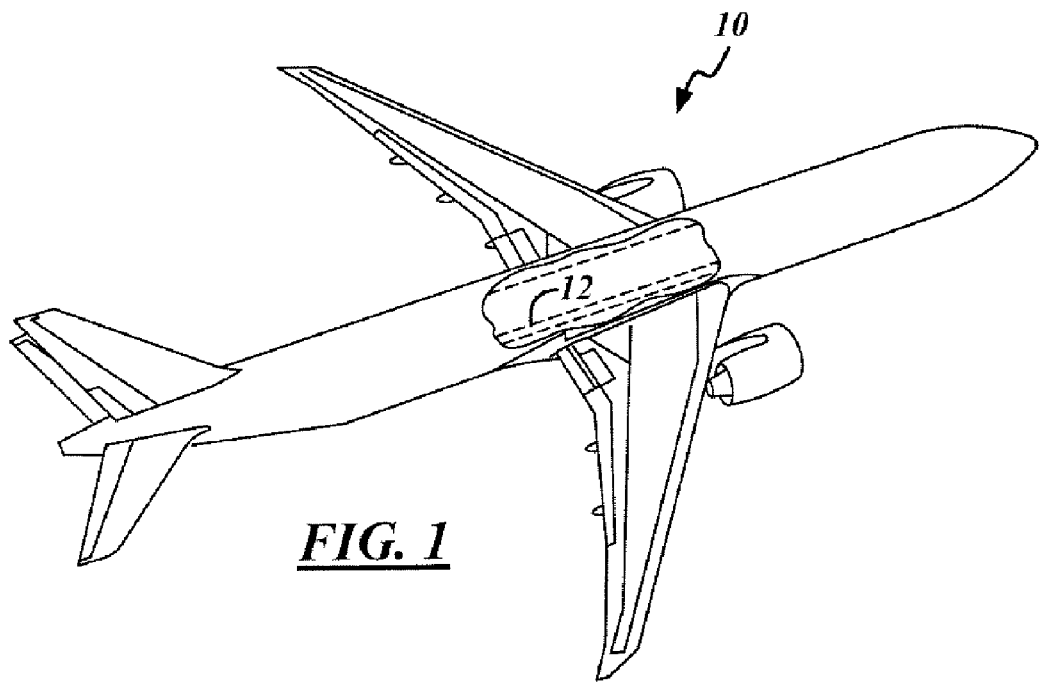
FIG. 1 is an illustration of an aircraft in accordance with the present invention.

Referring now to FIG. 1, which is an illustration of an aircraft 10 in accordance with the present invention. The aircraft 10 includes a plurality of aircraft floor panels 12 positioned throughout its interior, which serve both as structural and functional platforms within the aircraft 10. It is known that existing aircraft floor panels 12 do not adequately inhibit undesirable noise transmission within the aircraft interior. The present invention contemplates a novel approach to the reduction of such noise through the use of an aircraft floor panel design with fully integrated damping characteristics.

Figure 2:
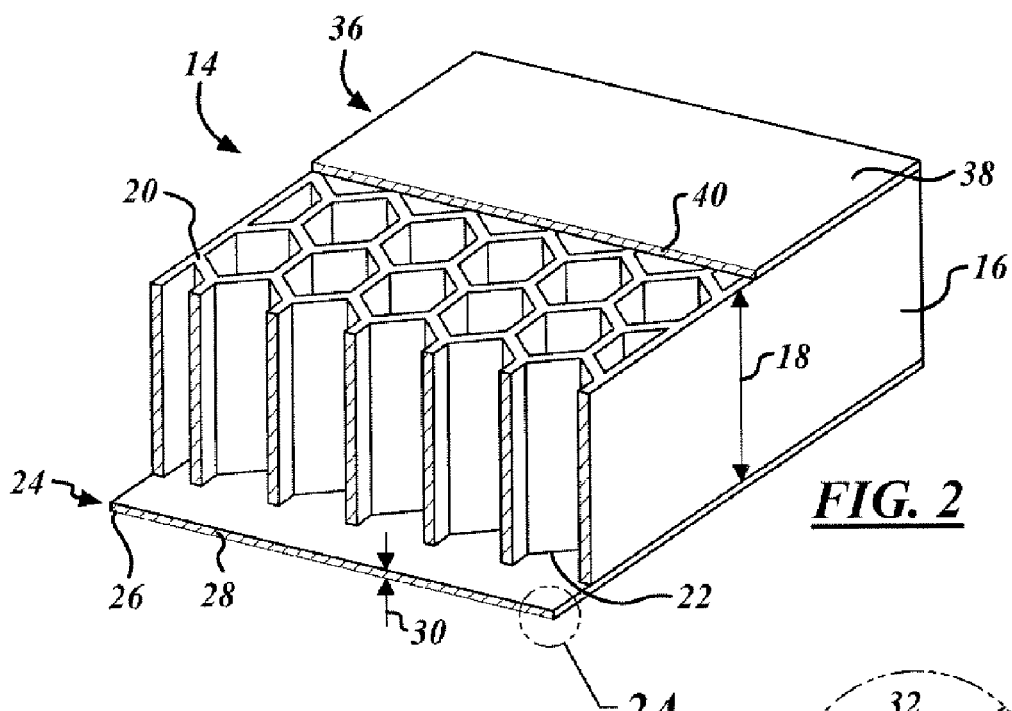
FIG. 2 is a detailed illustration of a portion of a floor panel for use in the aircraft illustrated in FIG. 1.
Figure 2A:
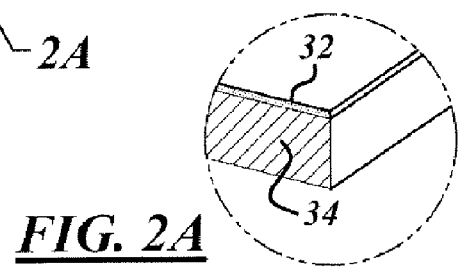
FIG. 2A is an enlarged detailed illustration of the lower damping face sheet comprising the combination of a fiberglass scrim and an epoxy cloth sheet.

Referring now to FIG. 2, which is a detailed illustration of a portion of an aircraft floor panel 12. The illustrated embodiment is one of a basic damped panel 14. The basic damped panel 14 is comprised of a core element 16, preferably a honeycomb core. At least one embodiment contemplates the use of a nomex core for use as the core element 16. Nomex is a phenolic reinforced aramid paper honeycomb core available from the Hexcel Corp., Stamford Conn., and MCGill Corp of El Monte Calif. Preferably, the core element 16 is constructed to have approximately 9 lbs./cubic feet density, 0.11 to 0.14 inch cell size, 475 psi minimum average L-shear property, and 260 psi minimum average W-Shear property. This specification establishes the requirements for heat resistant non-metallic honeycomb core for aircraft structural and general purpose applications. The material is fabricated from an aramid paper and stabilized by phenolic resin. The honeycomb core element 16 is comprised of a core thickness 18 that is approximately 0.46 inches. The core element 16 further includes an upper core surface 20 and a lower core surface 22. The terms upper and lower additionally refer to their orientation after installation within the aircraft 10.

The lower core surface 22 is sealed by way of a lower damping face sheet 24 affixed thereto. The lower damping face sheet 24 is preferably constructed of a lower material sheet 26 impregnated with a highly damped lower epoxy resin 28. Although a variety of highly damped lower epoxy resins are contemplated, in one embodiment the highly damped lower epoxy resin 28 is a low temperature cure epoxy resin. In another, it is specifically Duralco Superflex epoxy resin 4538N available from Cotronics Corp., Brooklyn, N.Y. Although Duralco epoxy resin is preferred, the present invention contemplates the use of a variety of two part low temperature cure (cure room temperature 70° F. to 180° F.) and low glass transition (−40° F. to 40° F.) temperature epoxy resins. The lower damping face sheet 24 has a lower sheet width 30 of approximately 0.02 inches comprising a 6 mil fiberglass scrim 32 and a 12 mil Super Flex epoxy cloth sheet 34 (3K-70-PW cloth). The combination of the highly damped lower epoxy resin 28 in use with the superflex cloth sheet 34 allows the lower damping face sheet 24 to induce improved damping characteristics into the floor panel 12 without a negative impact on manufacturing.

The floor panel 12 further includes an upper face sheet 36 comprised of an upper material sheet 38 impregnated with an upper epoxy resin 40. In one embodiment the upper face sheet 36 is also utilized for damping and therefore is an upper damping face sheet 36 and the upper epoxy resin 40 is also a highly damped upper epoxy resin. The upper face sheet 36 is utilized to seal the upper core surface 20. The upper damping face sheet 36 may be formed in a construction identical to the lower damping face sheet 24. Testing has indicated that the dual damped surfaces provide a flex load of 85 pounds and a deflection at 100 lbs of 1.8 inches. Alternately, the upper face sheet 36 may be formed with materials to generate high rigidity in comparison to the low rigidity of the lower damping face sheet 24. This provides a unique combination of rigidity above and damping from below. Since the upper face sheet 36 will largely experience compression and the lower damping face sheet 24 will largely experience tension during loading, the combination of upper rigid and lower flexible allow for an improved damping response without sacrificing overall floor panel 12 rigidity.

Figure 3:
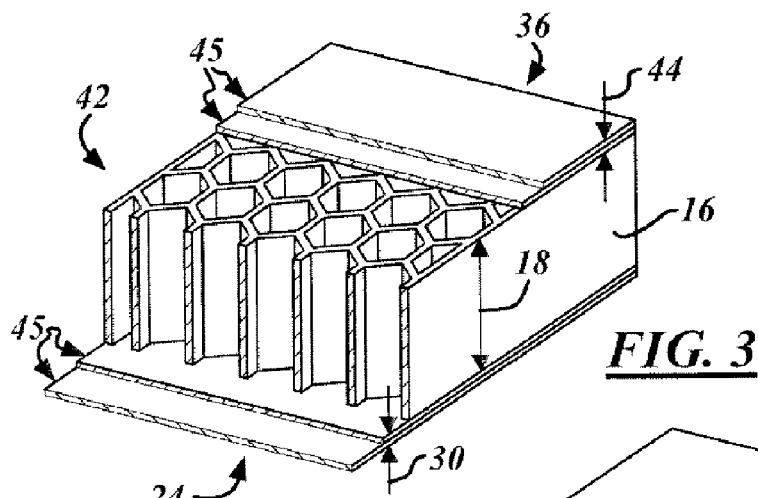
FIG. 3 is a detailed illustration of an alternate embodiment of the portion of the floor panel in FIG. 2, the detail illustrating a hybrid thick face embodiment.

An additional embodiment is illustrated in FIG. 3 which may be referred to as a hybrid thick face 42 embodiment. In this embodiment, the core element 16 utilized has a core thickness 18 of 0.46 inches of non-metallic honeycomb with a density range of 3.7 to 4.3 lbs. per cubic feet. In addition the lower damping face sheet 24 and an upper damping face sheet 36 utilize an intermediate modulus (22-25 MSI) toughened carbon pre-preg tape and that is a style 3k-70-PW carbon fiber cloth. This specification establishes requirements for 350 F cure toughened-epoxy pre-impregnated carbon fiber unidirectional tape and fabric products. The 3k-70-PW specification is a 3000 filaments/yarn, 12.5±0.5 warp count per inch, 12.5±0.5 fill count per inch, plain weave, worked. The lower damping face sheet 24 and an upper damping face sheet 36 have a lower sheet width 30 and upper sheet width 44 of approximately 0.034 inches each. This is preferably accomplished through the use multiple layers 45 of tape and low strength cloth combinations. The hybrid thick face sheet design 42 was tested and found to provide a flex load of 340 lbs and a deflection at 100 lbs of only 0.278 inches.

Figure 4:
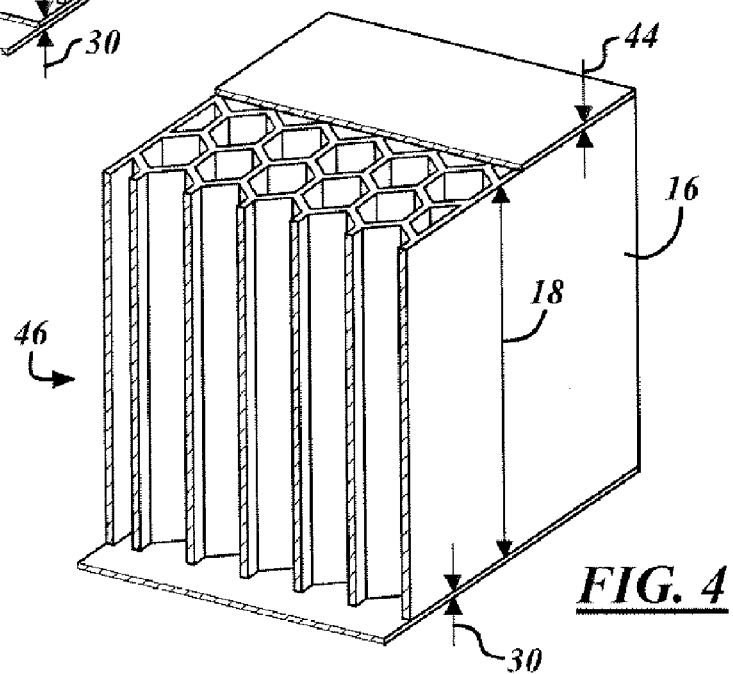
FIG. 4 is a detailed illustration of an alternate embodiment of the portion of the floor panel in FIG. 2, the detail illustrating a thick core embodiment.

A third embodiment is illustrated in FIG. 4 which may be referred to as the thick core 46 embodiment. In this embodiment the core thickness 18 was increased to approximately 1.25 inches. The upper and lower sheet thicknesses 30, 44 were kept at 0.017 inches apiece (preferably comprised of 2-ply 3k-70-PW cloth at 0.085 inches per ply). By increasing the core thickness 18 while retaining original sheet widths 30, 44 the flex load was found to be 269 lbs and the deflection at 100 lbs was found to be 0.2 inches. It should be understood that all test data in this patent is for illustrative purposes only in regards to the improvement of damping and flex characteristics.

Figure 5:
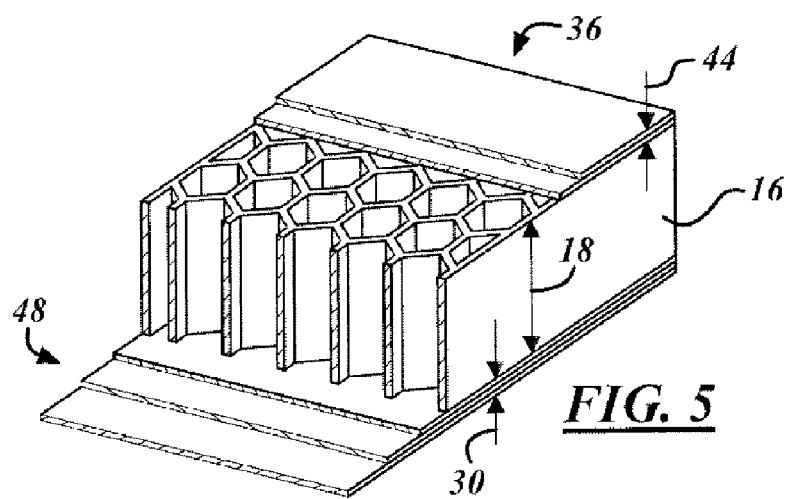
FIG. 5 is a detailed illustration of an alternate embodiment of the portion of the floor panel in FIG. 2, the detail illustrating a mixed face sheet embodiment.

Finally a fourth embodiment is illustrated in FIG. 5, which may be referred to as the mixed face sheet 48 embodiment. In the mixed face sheet 48 embodiment, the upper face sheet 36 is comprised of a high strength face sheet while the lower face sheet 24 is a low strength damping face sheet. The high strength face for example can be comprised of carbon/graphite tape laminate such as sold by Hexcel Corporation under the trade name AS4/Magnamite. In this embodiment the core thickness 18 may remain the same, but the upper face sheet 36 is preferably comprised of grade 190 tape with plies of 0/90 at 0.0075 inches combined to arrive at a upper sheet width 44 of 0.017 inches. The lower damping face sheet 24 is comprised of 0.024 inches of carbon/epoxy cloth such as the 3k-70-PW cloth (preferably comprised of 3 plies of 0.0085 cloth) impregnated with a two part epoxy resin with superior flexibility at low temperatures. This combination of upper face rigidity with lower face flex provides a unique combination of benefit in combating vibrations. It should be understood that in this embodiment, the lower damping face sheet 24 may still be designed to be high in tensile strength to prevent failure while still being low strength and flexible in the designed range required for damping. This proposed embodiment was found to provide a flex load of 310 pounds while having a deflection at 100 lbs of only 0.55 inches.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An integrally damped aircraft floor panel comprising:
   a honeycomb core element having an upper core surface, a lower core surface, and a core thickness greater than 0.4 inches;
   an upper face sheet assembly mounted to and sealing said upper core surface, said upper face sheet assembly comprised of at least one upper material sheet impregnated with an upper epoxy resin; and
   a lower damping face sheet assembly mounted to and sealing said lower core surface, said lower damping face sheet assembly including at least one lower material sheet impregnated with a highly damped lower epoxy resin;
   wherein said upper face sheet assembly generates high rigidity in comparison to the low rigidity of the lower damping face sheet assembly and said lower damping face sheet assembly dampens vibrational noise.

2. An aircraft floor panel as described in claim 1, wherein:
   said upper face sheet assembly comprises an upper damping face sheet assembly; and
   said upper epoxy resin comprises a highly damped upper epoxy resin.

3. An aircraft floor panel as described in claim 1, wherein said lower damping face sheet assembly comprises a plurality of lower material sheets impregnated with a low temperature epoxy resin.

4. An aircraft floor panel as described in claim 1, wherein said honeycomb core element comprises a phenolic reinforced aramid paper honeycomb core.

5. An aircraft floor panel as described in claim 1, wherein said highly damped lower epoxy resin comprises a low temperature cure epoxy with low glass transition temperature.

6. An aircraft floor panel as described in claim 1, wherein said core thickness is greater than 1.0 inches.

7. An aircraft floor panel as described in claim 1, wherein said lower damping face sheet assembly comprises a lower sheet width less than 5% of said core thickness.

8. An aircraft floor panel as described in claim 1, wherein said lower damping face sheet assembly comprises:
   at least one tape layer; and
   at least one low strength cloth layer.

9. An aircraft floor panel as described in claim 1, wherein said lower damping face sheet assembly comprises:
   at least one fiberglass scrim layer; and
   at least one highly damped superflex layer, said scrim layer comprising half the width of said superflex layer.

10. An aircraft floor panel as described in claim 1, wherein:
said upper face sheet assembly comprises a high rigidity upper face sheet assembly; and
said lower damping face sheet assembly comprises a low rigidity lower damping face sheet assembly.

11. An aircraft floor panel as described in claim 1, wherein:
said lower damping face sheet assembly comprises a high tensile strength lower damping face sheet assembly.

12. An integrally damped aircraft panel comprising:
a core element having an upper core surface, a lower core surface, and a core thickness greater than 0.4 inches;
an upper damping face sheet assembly mounted to and sealing said upper core surface, said upper damping face sheet assembly comprising at least one upper material sheet impregnated with a low-temperature resin;
a lower damping face sheet assembly mounted to and sealing said lower core surface, said lower damping face sheet assembly including at least one lower material sheet impregnated with a low-temperature resin;
wherein said lower damping face sheet assembly generates high rigidity and said upper damping face sheet assembly dampens vibrational noise.

13. An aircraft panel as described in claim 12, wherein said core thickness is greater than 1.0 inches.

14. An aircraft panel as described in claim 12, wherein said lower damping face sheet assembly comprises:
at least one tape layer; and
at least one low strength cloth layer.

15. An aircraft panel as described in claim 12, wherein said lower damping face sheet assembly comprises:
at least one scrim layer; and
at least one superflex layer.

16. An aircraft panel as described in claim 12, wherein:
said upper damping face sheet assembly comprises a high rigidity upper damping face sheet assembly; and
said lower damping face sheet assembly comprises a low rigidity lower damping face sheet assembly.

17. A method of reducing noise in an aircraft floor panel comprising:
manufacturing a honeycomb core element such that it comprises an upper core surface, a lower core surface, and a core thickness greater than 0.4 inches;
sealing said upper core surface by applying an upper damping face sheet assembly comprised of at least one upper material sheet impregnated with an upper damping resin;
curing said upper damping face sheet assembly, said upper damping face sheet assembly integrating damping characteristics into the aircraft floor panel;
sealing said upper core surface by applying an lower face sheet assembly comprised of at least one lower material sheet impregnated with a lower damping resin; and
curing said lower damping face sheet assembly, said lower damping face sheet assembly integrating damping characteristics into the aircraft floor panel.

18. A method as described in claim 17, wherein:
said upper damping face sheet assembly comprises a high rigidity upper damping face sheet assembly; and
said lower damping face sheet assembly comprises a low rigidity lower damping face sheet assembly.

19. A method as described in claim 17, wherein:
said lower damping face sheet assembly comprises a high tensile strength lower damping face sheet assembly.

20. method as described in claim 17, wherein said lower damping face sheet assembly comprises:
at least one scrim layer; and
at least one superflex layer.

* * * * *